United States Patent Office 2,929,714
Patented Mar. 22, 1960

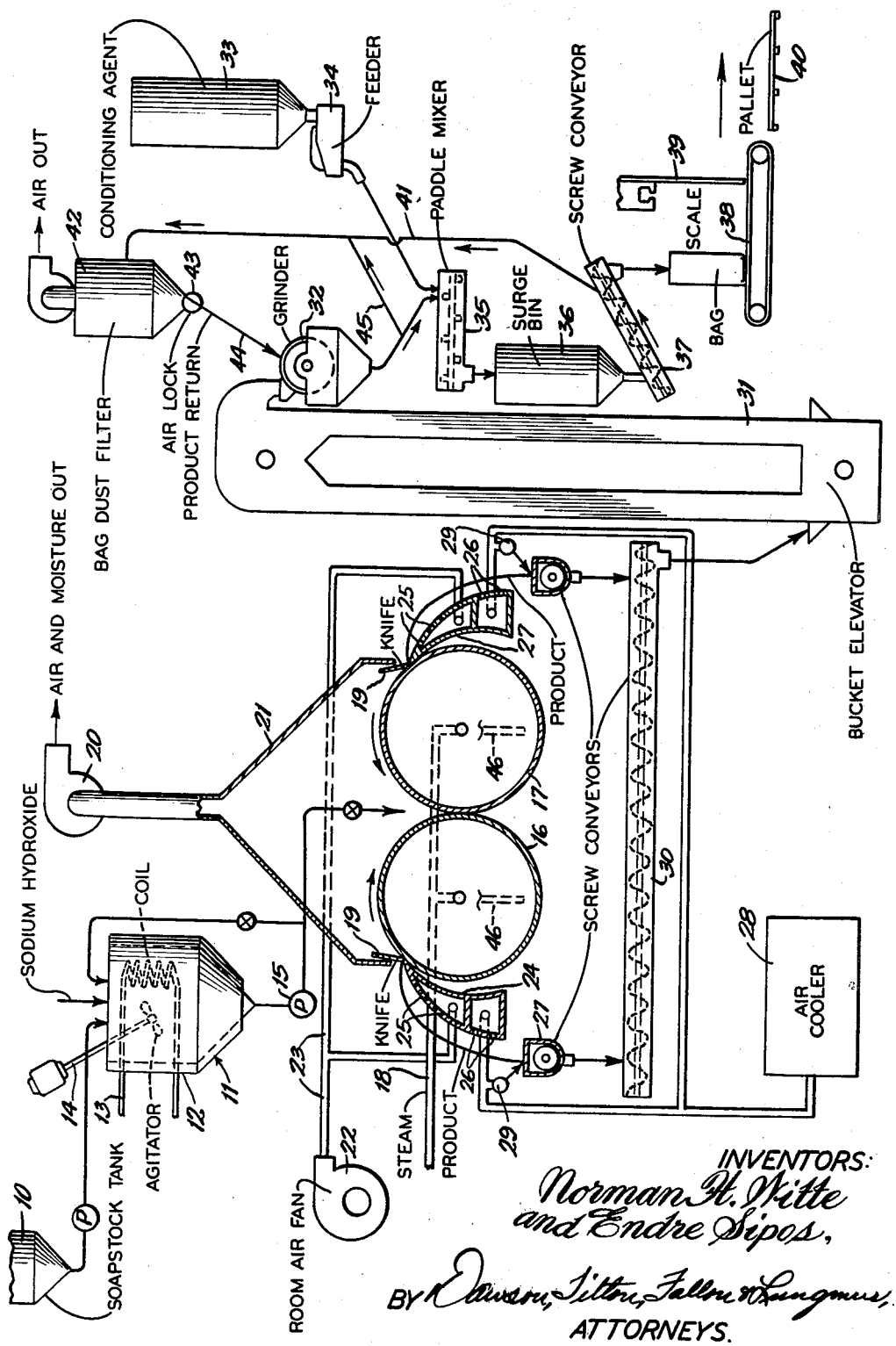

2,929,714

TREATING SOAPSTOCK

Norman H. Wittee and Endre Sipos, Decatur, Ind., assignors to Central Soya Company, Inc., Fort Wayne, Ind., a corporation of Indiana Application June 16, 1958, Serial No. 742,090

9 Claims. (Cl. 99—4)

This invention relates to a dry fat treating process, and, more particularly, to a process in which dried soybean soapstock is recovered and in which the soapstock may be combined with a dusting agent such as fine calcium phosphate, limestone, ground soybean hulls, or some other suitable carrier that disperses easily on the surface of the soapstock particles without forming excessive agglomerates and giving free flowing characteristics to the finished product.

While soybean oil has a very low xanthophyll content, and has not been considered heretofore a potential source for broiler skin pigmentation, it has been discovered that a considerable concentration of xanthophyll is obtained in soybean soapstock. Soybean soapstock is obtained in the alkaline refining of soybean oil and is the residue therefrom, containing a saponified fatty acid fraction, a phosphatide and sterol fraction, together with some of the pigments of the oil. Upon refining with sodium hydroxide, the carotenoid pigments are co-precipitated from the oil with the other constituents of the soapstock. It is emulsified in character and is a high energy source, containing approximately 70% of fatty acids on a dry basis. It is a known market commodity.

The concentration of xanthophyll in soapstock was not discovered in the feed industry, probably because even if a small amount of xanthophyll was known to be in the soybean oil, it would probably be assumed that such xanthophyll would be destroyed in the strongly acidic medium of the acidulation process to which the soap is usually subjected to make it a more suitable item for commerce.

The disposal of soapstock (not acidulated) as a commodity imposes a real problem for the trade because of the high moisture content, gelatinous properties and tendency for spoilage. High moisture content increases the freight rate of this inexpensive material enormously, and it is also partially responsible for the spoilage problem.

On the other hand, soapstock has many desirable characteristics and would have a much better sales appeal—as it is set forth in this application—if these disadvantageous handling problems were solved. For example, the alkaline medium and the tocopherol content of soapstock offers good protection for xanthophyll pigments provided that no bacterial or enzymatic spoilage occurs.

For economic, transportation, and stability reasons, as well as for other reasons, it is important to have the soapstock in a dry form. Drying presents, however, difficult problems. Due to the presence of excessive amounts of alkali, gums, carbohydrate lipids, etc., the dry soapstock is very hygroscopic and becomes sticky when stored in the air of high humidity, and even in the absence of extraneous moisture, the particles tend to stick together in storage when subjected to weight or pressure. Such a product is difficult to handle, and it is almost impossible to proportion it into feed formulas. Since dried soaps have higher melting points than ordinary fats, heating the soapstock ordinarily will not improve the product.

An object of the present invention is to provide a heating method and process which overcomes the difficulties referred to above and enables a free flowing soapstock product to be produced. Another object is to provide a process for the drying of soapstock within pH ranges and while employing refrigerated air so as to produce a free flowing particulate product. Yet another object is to treat soapstock with a combination of steps that includes conditioning with heat and agitation, pH adjustment, drying with simultaneous removal of the condensate, and finally grinding the dried soapstock and combining it with a conditioning agent in order to reduce the hygroscopicity of the product. Still another object is to carry out such a drying operation by drum drying and in which cooling air is introduced into the drum dried product to render the product friable for transporting and for humidifying the surrounding air. Other specific objects and advantages will appear as the specification proceeds.

When the foregoing steps of this invention are carried out in their proper sequence, the value of soapstock is greatly increased for various applications, but particularly for feeds. The invention thus provides a free-flowing, dry soapstock ingredient in such a physical form that enables the operator to add this material in any proportion to the feed with a high degree of accuracy. Furthermore, such an ingredient is a good source of pigmentation and calorific energy for poultry because of the good stability of carotenoid pigments and fatty acids in the dry, nonhygroscopic particles of the soap.

The invention may be carried out in various forms of apparatus. One embodiment of the invention may be practiced in the apparatus shown in the accompanying drawing.

In the illustration given, raw wet soapstock as produced in the caustic refining of non-degummed and/or degummed soybean oil is accumulated in the soapstock tank 10 and is transferred as required to the soap crutcher 11, where it is conditioned by the application of steam to the steam jacket 12 or by the steam coils 13 to attain optimum fluid character. Agitation is supplied by the motor-driven agitator 14 to assure a homogeneous mixture. Sodium hydroxide is also added, if required, to adjust the pH of the homogeneous mass to above pH 8.5. The raw soapstock as transferred to the soap crutcher 11 normally has a moisture content of 50% (minus/plus 10%), a total fatty acid content of 70% (dry basis minus/plus 5%), and a xanthophyll content of 600 micrograms per gram (dry basis minus/plus 100 mcg./gram).

The soapstock is transferred by a transfer pump 15 at the rate of about 400 pounds per hour to a drum dryer, where it continuously accumulates in a pool between two rolls 16 and 17. The rolls 16 and 17 are driven by a drive (not shown) so as to move inwardly in the direction of the arrows and are adjusted for clearance so as to permit a thin film of soapstock to be deposited on each roll.

Steam is continuously introduced to the rolls through the line 18. The steam condensate is continuously withdrawn from the rolls by the dip pipes 46 through a rotating joint on the opposite end of the drum. As the rolls rotate, moisture is removed from the film of soapstock on each roll so that it becomes a semi-solid by the time it reaches the doctor knife 19 imposed near the outer upper portion of each roll. The knife edge separates the film of soapstock from the roll surface in a substantially continuous sheet which may be from .002 to .010" thick. Moisture removed on the roll is exhausted to the atmosphere by means of a fan 20 connected to the hood 21 immediately above the double drum dryer.

Room air is introduced by blower 22 through the line 23 into the top portion of a cooling header 24 having ports 25 in its upper side so as to lift the dried soapstock sheet from the perforated cooling header surfaces and convey the sheet from the knife blade edge. Refrigerated air is introduced into the bottom section of the cooling header and discharged through the perforations 26 in the outer side thereof to make the sheet friable prior to its introduction to the screw conveyor 27. The air flows from an air cooler 28. We prefer also to introduce an added quantity of refrigerated air through the outlets 29 into the screw conveyors to further cool the soapstock sheet and to dehumidify its surrounding air. In the specific example, about 200 pounds per hour of soapstock at less than 1% moisture is conveyed through the conveyor 30 and the elevator 31 to a grinder 32, where it is sized for the desired use. If desired, the ground soapstock may be combined with a conditioning agent from the storage tank 33, from which it is discharged through feeder 34, the combination being formed in a paddle mixer 35. Finely ground limestone as supplied from the conditioning agent bin 33 may be introduced in the paddle mixer along with the material from the grinder, and in the mixer they are intimately blended so as to reduce the effects of the hygroscopic nature of the dried soapstock. From the mixer 35, the finished product goes to a surge bin 36 and appropriate conveying and packaging equipment for packaging the product for use. In the specific illustrative example given, such equipment is illustrated by a screw conveyor 37, a bag conveyor 38 carrying a bag, and a scale device 39, the filled bag being discharged upon a pallet 40.

While, in the foregoing detailed description of a specific procedure, we have set forth a number of steps which may be employed, it will be understood that some of the steps may be omitted in the practice of our invention and are recited herein in the description of the process for the purpose of showing the preferred operation.

Suitable aspiration equipment is provided to insure proper circulation of the chilled air through the conveying, elevating and grinding apparatus and to prevent dusting out of dust from all of the equipment. Aspirated air flows through lines 41 and 45 to dust filter 42; the separated dust passes through airlock 43 and then spout 44 and returns to the process in grinder 32.

Specific examples of the procedure which may be followed in the practice of our invention may be set out as follows:

*Example I*

Raw, wet, caustic refined soybean oil soapstock having a moisture content of 48%, a total fatty acid content of 33%, a xanthophyll content of 303 mcg. per gram, and a pH of 7.8, was transferred from a storage tank to the soapstock crutcher, where is was heated to 130° F. with constant agitation. Sodium hydroxide was added at this point to the material in order to bring up its pH from 7.8 to 8.6. This adjustment takes out the oiliness of the product and assures better drying. The adjusted and conditioned material was then transferred to the drum dryer at a rate of 402#/hour and it was dried according to the foregoing specifications. The average thickness of the continuous sheet coming off from the roll surface measured .004 inch.

The product after grinding contained 0.8% moisture, 67% total fatty acids, 608 mcg./gm. of xanthophyll, and it was a free-flowing powder. The product, even at this point, had excellent handling properties; for our purpose, however, it was desirable to add a conditioning agent to reduce the hygroscopicity that develops in storage, especially when the material is subjected to pressure.

*Example II*

Ground drum-dried soybean soapstock obtained by the process described in Example I and in the foregoing specification was combined with 200 mesh limestone in a paddle mixer in a ratio of 2 parts of soapstock and 1 part of limestone. After intimate mixing, this material was placed in porous cloth bags to permit the exchange of humidity with the environment. The bags were then stored for two weeks in an incubator held at 100° F. and 60% relative humidity. In order to simulate pile stacking, 15 pounds of sand was placed over the top of each bag. At night the heat wash shut off to allow the material to cool down (this reproduced surface condensation of moisture as it could be expected under severe outside conditions).

At the end of the test, the material was recovered in an excellent condition. It was free-flowing, with almost no caking, and could be broken up easily into a homogenous product. The control sample containing no limestone was solid, caked, gummy, and could not be broken apart for handling.

*Example III*

The process of Examples I and II, whereby 300 mesh limestone was added to ground, drum dried soapstock. Under the conditions of Example II, the material showed satisfactory results with the exception that slight caking was observed on the surface. The product could be broken up, however, and posed no difficulties in handling or transportation.

*Example IV*

The process of Examples I and II, but 1 part of 200 mesh limestone was added to 3 parts of ground, drum dried soapstock. Results were similar in every respect to those obtained in Example II, with the exception of a slight hardening on the surface. This did not cause, however, any practical difficulties. When storage humidity and packing pressure were not extremely severe, the 1:3 ratio of limestone to soapstock was found to be satisfactory.

*Example V*

The process of Examples I and II, except soda ash, calcium phosphate, or some other fine mineral powder, was used instead of limestone. With the addition of 1 part of these ingredients to 2 parts of ground, drum dried soapstock, satisfactory results were obtained. Nevertheless, limestone had slightly better performance than any other ingredient tried.

*Example VI*

The process of Examples I and II, except 10% of 200 mesh limestone was added to drum dried soapstock prior to grinding and then 15% was added to the ground product in the paddle mixer. This product was ground with exceptional ease, leaving no coating in the conveying system or the grinder. Although, under normal circumstances, this step is not necessary, certain batches of soapstock might be unusually "oily," thus making pre-dusting desirable.

*Example VII*

The process of Example VI, except 10% of meal dust from dust cyclones, stocking collectors, etc., of the soybean oil meal or grain processing, was used to cover the dried soapstock prior to the grinding. The ground product then again was mixed with 15% of additional amount of limestone to make it a free-flowing, uniform product.

*Example VIII*

The process of Examples I–VII, except dried cottonseed soapstock was used instead of the soybean soapstock. Other soapstocks from vegetable oil refining steps gave similar results.

Example IX

The process of Examples I–VII, whereby the ground dried soapstock material conditioned with 25% of limestone carrier was added to a poultry feed at 6% level. The conveying, proportioning and mixing of the dry, conditioned ingredient was carried out with ease with the result of a homogeneous, free-flowing finished poultry feed. Such a feed is an excellent source of carotenoid pigments and has high caloric value. Because of the hydrolyzing effect of feed protein, 54% of the soapstock was recovered as fat by the conventional fat analysis method. The hydrolysis is the result of an interaction of the soap and feed protein with the subsequent liberation of fatty acids. Soapstock is not soluble in common fat solvents.

Example X

Raw wet caustic refined soybean oil soapstock from the refining of soyben oil low in phosphatide content (having a moisture content of 52%, a total fatty acid content of 31%, a xanthophyll content of 400 mcg./g., and a pH of 8.7), was transferred from a storage tank to the soapstock crutcher, where it was heated to 130° F. with agitation. Since the pH was already above 8.5, no sodium hydroxide was added. The heated material was then transferred to the drum dryer at a rate of 420 lbs./hr. and was dried according to the foregoing specifications.

The product after grinding contained 0.8% moisture, 69% total fatty acids, and 825 mcg./gm. of xanthophyll. It was a free-flowing product and had very satisfactory handling characteristics. No conditioning agent was required because the starting soapstock contained less of the gummy hygroscopic phosphatidic material which interferes with good handling characteristics; the product was stored in moisture-resistant bags and retained good handling properties for a period of three weeks.

While, in the foregoing specification, we have set out specific steps and procedure in considerable detail for the purpose of illustrating embodiments of the invention, it will be understood that such details may be varied widely by those skilled in the art without departing from the spirit of our invention.

We claim:

1. In a process for producing a dry pigmentation agent, the steps of refining soybean oil extracted by solvent from soybeans through the use of an alkaline agent to obtain a soapstock, heating said soapstock, adjusting the pH of the soapstock to above pH 8.5, passing said soapstock in the form of a film over a drying surface, chilling said film, and grinding the same to form a free-flowing product.

2. The process of claim 1, in which said film is brought into contact with a stream of cold fluid to render the same friable before grinding.

3. The process of claim 1, in which ground, film dried soapstock is admixed with a conditioning powder.

4. In a process for treating soapstock obtained by the alkaline refining of soybean oil, the steps of conditioning the soapstock at a temperature between 100 and 150° F. while agitating the same, keeping the pH thereof above pH 8.5, passing the soapstock in the form of a film over a heating surface to dry the soapstock, chilling said film and grinding the dried soapstock.

5. The process of claim 4, in which the ground soapstock is mixed with a dry powder to form with said soapstock a free-flowing material.

6. The process of claim 5, in which the soapstock is combined with the powder at the level of 5–75%.

7. The process of claim 5, in which the conditioning powder is selected from the group consisting of limestone, soda ash, phosphates, meal dust, and grain dust, in order to make the mixture a free-flowing, dry material, having no stickiness or hygroscopicity.

8. In a process for the treating of soapstock obtained in the alkaline refining of soybean oil, the steps of heating the soapstock in the range of 100 to 150° F. while agitating the same, adjusting the pH to a pH above 8.5, film drying the soapstock, chilling the film and grinding the same, and adding limestone having a fineness of 200–300 mesh to the dried soapstock.

9. The process of claim 8, in which the limestone is added at the levels of 5–50%.

References Cited in the file of this patent

UNITED STATES PATENTS

| | | |
|---|---|---|
| 2,087,788 | Thal | July 20, 1937 |
| 2,835,584 | Rosenberg | May 20, 1958 |